No. 743,363. PATENTED NOV. 3, 1903.
R. O. WIGLEY.
SAW COLLAR TRUING MACHINE.
APPLICATION FILED JUNE 26, 1903.
NO MODEL.
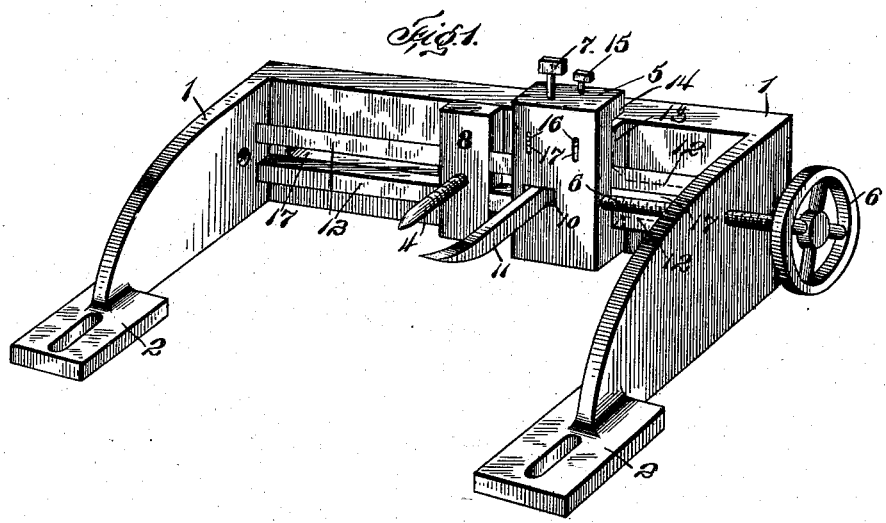
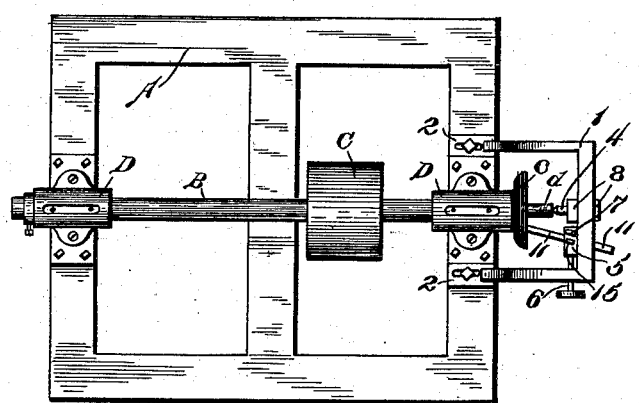
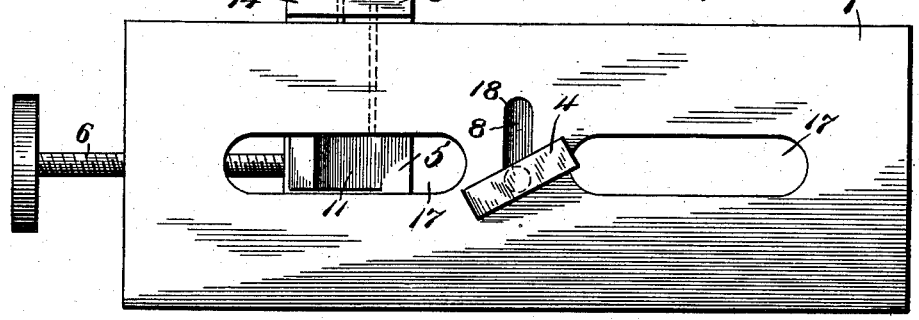
WITNESSES:
INVENTOR
Robert O. Wigley.
BY
ATTORNEYS.

No. 743,363. Patented November 3, 1903.

UNITED STATES PATENT OFFICE.

ROBERT OSCAR WIGLEY, OF BREWTON, ALABAMA.

SAW-COLLAR-TRUING MACHINE.

SPECIFICATION forming part of Letters Patent No. 743,363, dated November 3, 1903.

Application filed June 26, 1903. Serial No. 163,231. (No model.)

*To all whom it may concern:*

Be it known that I, ROBERT OSCAR WIGLEY, a citizen of the United States, and a resident of Brewton, in the county of Escambia and State of Alabama, have made certain new and useful Improvements in Saw-Collar-Truing Machines, of which the following is a specification.

The collars which clamp and hold the circular saw upon the mandrel or arbor sometimes get out of true, being worn so by the imperceptible movement of the saw in action. When so worn, a very slight variation at the center of the sawmill when multiplied by the distance from the center to the circle of teeth gives an irregular motion to the saw, and it is then necessary to turn off these collars to a true plane again. This is usually done by hand; but it is unsatisfactory and uncertain, as a tool held in the hand will of itself follow the irregularities of the collar.

My invention provides a simple and inexpensive machine specially designed as an attachment to the sawmill husk or frame by which the work of truing the collars is conveniently, expeditiously, and accurately effected.

Figure 1 is a perspective view of the machine from the inside. Fig. 2 is an outer side view; and Fig. 3 is a plan view of a machine, on a reduced scale, showing it applied to the sawmill husk or frame when being used.

In Fig. 3 of the drawings, A represents the sawmill husk or frame, upon which in bearings D D is journaled the saw-mandrel B, which carries a band-pulley C, by which it is driven. On the end of the saw-mandrel is arranged one of the collars c, which is one of a pair which clamps the circular-saw blade between them, the other collar or washer being taken off, as is necessary when the collars are being trued. This other collar, which is in the nature of a washer, fits onto the reduced and screw-threaded end d of the mandrel and is secured by a nut in the well-known way.

My machine attachment is designed to true the adjacent faces of the collars, and the parts of my device are indicated by numerals and are shown on a large scale in Figs. 1 and 2.

1 is a rectangular frame composed of two side arms and a front piece, with flat and slotted plate extensions 2 at the ends of the side arms, which plate extensions are adapted to receive bolts that pass through the sawmill-frame to connect the attachment thereto, the two side arms being disposed at equal distance from and on opposite sides of the saw-mandrel.

The front piece of the frame 1 is slotted transversely in the middle in vertical direction at 18 and carries a vertically-adjustable slide 8 on the inner side, through which is tapped a center screw 4, the shank of the screw passing through the vertical slot 18 of the front piece of the frame. This center screw is designed to enter a little center recess formed in the end of the saw-mandrel and holds the frame 1 in true stationary position in relation to the screw-mandrel, as seen in Fig. 3, the mandrel turning against the end of the center screw.

In the front piece of the frame 1 there is formed on each side of the center screw a longitudinal slot 17, disposed horizontally, and on the inner sides of these slots are formed or attached dovetail or undercut guides 12, upon which slides horizontally the tool-carrier 5. This carrier has an opening 10, through which the turning-tool 11 projects into engagement with the collar to be turned, as seen in Fig. 3.

The carrier 5 slides horizontally upon the dovetail guides 12 and is adjusted thereon by the feed-screw 6, which is tapped in one of the side arms of the frame 1 and is swiveled at its inner end in the tool-carrier, so that by turning the screw the tool is carried in and out across the face of the collar being turned. The tool 11 is clamped in the tool-carrier by a vertical set-screw 7, tapped in the carrier and bearing upon the tool. The tool-carrier and tool are also tightened vertically, and for this purpose the tool-carrier is made with a separate block 13, Fig. 1, at its upper end and with a flange 14 overlapping the block, and a set-screw 15 is tapped through the flange and against the block, so as to tighten the tool against vertical movement. To hold this block in its vertical movement, it is formed with guide-pins 16 16, that protrude into slots 17 17 in the carrier.

When the tool is clamped in the carrier with the cutting edge in position against the collar c and the feed-screw 6 is turned, it will be seen that the rotary motion of the saw-mandrel causes the collar to rotate and be turned true by the action of the tool.

To turn the outside collar or washer of the mandrel, which is not shown, said collar or washer is merely reversed and put back on the mandrel, so that it faces outwardly and is then tightly clamped in this position by the mandrel-nut while being trued.

By means of the vertical adjustment of the center screw 4 it can be adjusted so as to exactly strike the center of the mandrel.

As shown, I have arranged two horizontal guides and slots in the middle part of the frame, one on each side of the center screw, into either of which the tool-carrier may be adjusted by loosening its tightening-block. There are also in the side arms separate holes for the feed-screw 6 to permit this change.

Having thus described my invention, what I claim as new, and desire to secure by Letters Patent, is—

1. A saw-collar-truing machine, comprising a rectangular frame having two side arms with fastening devices at the free ends thereof for attachment to the saw-frame, a front cross-piece connecting these arms and having a vertical transverse slot in the middle with an adjustable center screw therein, and having also a horizontal guide for a tool-carrier, a tool-carrier and tool adjustable thereon, means for clamping the tool and means for feeding the carrier, substantially as shown and described.

2. A saw-collar-truing machine, comprising a rectangular frame having two side arms with fastening devices at the ends, a front cross-piece connecting these arms and having undercut guides on its inner face and a vertical transverse slot in the middle with an adjustable slide and center screw working therein, a flanged tool-carrier made horizontally adjustable along the front piece of the frame upon the undercut guides and provided with a feed-screw, a turning-tool arranged therein and provided with a set-screw, and a separate tightening-block arranged within the flange of the tool-carrier and a set-screw tapped through the flange and binding against the block for holding the carrier against vertical movement, substantially as described.

ROBERT OSCAR WIGLEY.

Witnesses:
W. H. HARPER,
R. A. BELL.